United States Patent [19]
Sagi

[11] Patent Number: 6,052,747
[45] Date of Patent: Apr. 18, 2000

[54] MICROCOMPUTER INCORPORATING PERIPHERAL CIRCUITS

[75] Inventor: Katsuichi Sagi, Tokyo, Japan

[73] Assignee: NEC Corporation, Japan

[21] Appl. No.: 08/950,988

[22] Filed: Oct. 15, 1997

[30] Foreign Application Priority Data

Oct. 15, 1996 [JP] Japan .................................. 8-272060

[51] Int. Cl.[7] .................................................. G06F 13/00
[52] U.S. Cl. .................................................. 710/52; 710/5
[58] Field of Search ............................ 395/872, 561, 395/551, 306, 307, 309; 710/52, 126, 127, 129, 5, 8; 713/1, 400

[56] References Cited

U.S. PATENT DOCUMENTS

| | | | |
|---|---|---|---|
| 4,860,198 | 8/1989 | Takenaka | 364/200 |
| 5,471,590 | 11/1995 | Melo et al. | 395/288 |
| 5,557,757 | 9/1996 | Gephardt et al. | 395/306 |
| 5,588,124 | 12/1996 | Hongo | 710/107 |
| 5,630,145 | 5/1997 | Chen | 395/750 |

FOREIGN PATENT DOCUMENTS

| | | |
|---|---|---|
| 63-146132 | 6/1988 | Japan . |
| 2-81155 | 3/1990 | Japan . |
| 3-163632 | 7/1991 | Japan . |
| 5-120210 | 5/1993 | Japan . |

*Primary Examiner*—Thomas M. Heckler
*Attorney, Agent, or Firm*—Ostrolenk, Faber, Gerb & Soffen, LLP

[57] ABSTRACT

In a microcomputer including a central processing unit (CPU), at least one peripheral circuit, and buses connected between the CPU and the peripheral circuit, a latch circuit is connected to at least a specific one of the buses for generating a control signal for the peripheral circuit.

8 Claims, 12 Drawing Sheets

PRIOR ART
READ BUS CYCLE
B1 B2 B3 B4
Fig. 2A AD0 ~ AD9
Fig. 2B AD10 ~ AD15
Fig. 2C LT
Fig. 2D SEL
Fig. 2E R/W
Fig. 2F ST
Fig. 2G R
Fig. 2H W
Fig. 2I BW
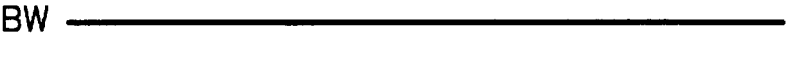

PRIOR ART
WRITE BUS CYCLE
B1　B2　B3　B4
*Fig. 3A* AD0~AD9 
*Fig. 3B* AD10~AD15 
*Fig. 3C* LT 
*Fig. 3D* SEL 
*Fig. 3E* R/W 
*Fig. 3F* ST 
*Fig. 3G* R 
*Fig. 3H* W 
*Fig. 3I* BW 

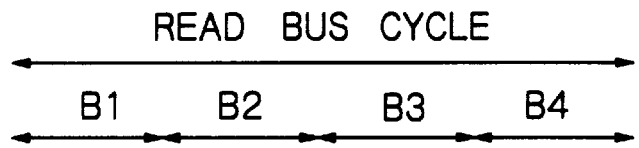
*Fig. 8A* AD0 ~ AD9
*Fig. 8B* AD10 ~ AD15
*Fig. 8C* AD14
*Fig. 8D* LT
*Fig. 8E* SEL
*Fig. 8F* R/W
*Fig. 8G* ST
*Fig. 8H* R
*Fig. 8I* W
*Fig. 8J* BW

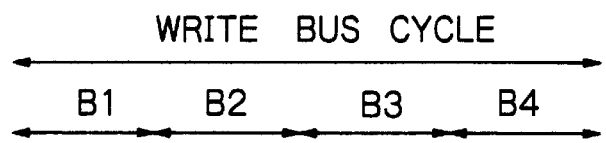
Fig. 9A  AD0 ~ AD9
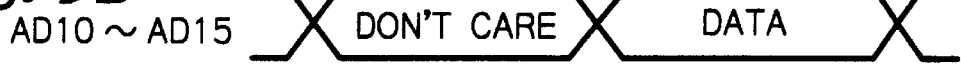
Fig. 9B  AD10 ~ AD15
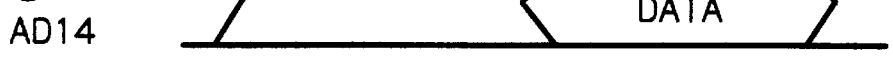
Fig. 9C  AD14
Fig. 9D  LT
Fig. 9E  SEL
Fig. 9F  R/W
Fig. 9G  ST
Fig. 9H  R
Fig. 9I  W
Fig. 9J  BW

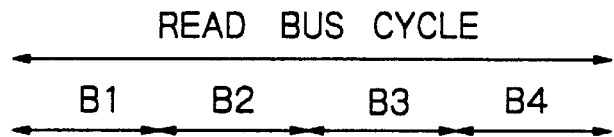
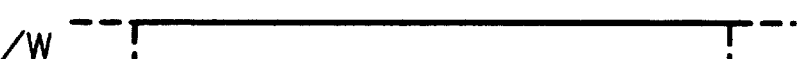
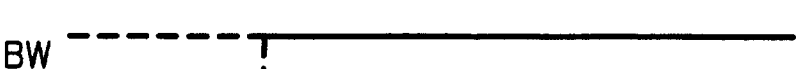

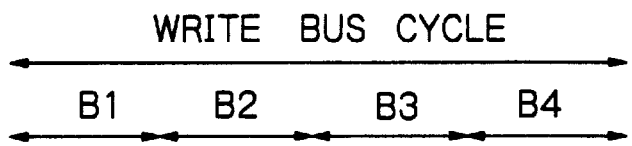

MICROCOMPUTER INCORPORATING PERIPHERAL CIRCUITS

BACKGROUND OF THE INVENTION

1. Field of the Invention

The present invention relates to a microcomputer incorporating peripheral circuits.

2. Description of the Related Art

In a prior art microcomputer including a central processing unit (CPU), at least one peripheral circuit, and buses connected between the CPU and the peripheral circuit, special control signal lines for control signals are also connected between the CPU and the peripheral circuit, thus carrying out a read/write operation. This will be explained later in detail.

In the above-mentioned microcomputer, however, a large number of control signal lines are required. Since the control signal lines are generally very long, the large number of control signal lines is disadvantageous in view of the integration. Also, if the number of peripheral circuits incorporated into one chip is increased, the number of control signal lines is further increased, which further reduces the integration.

SUMMARY OF THE INVENTION

It is an object of the present invention to enhance the integration of a microcomputer incorporating peripheral circuits.

According to the present invention, in a microcomputer including a CPU, at least one peripheral circuit, and buses connected between the CPU and the peripheral circuit, a latch circuit is connected to at least a specific one of the buses for generating a control signal for the peripheral circuit.

Thus, since a part of the buses serve as control signal lines, the number of control signal lines is reduced.

BRIEF DESCRIPTION OF THE DRAWINGS

The present invention will be more clearly understood from the description as set forth below, in comparison with the prior art, with reference to the accompanying drawings, wherein:

FIGS. 2A through 2I are timing diagrams for showing the read operation of the microcomputer of FIG. 1;

FIGS. 3A through 3I are timing diagrams for showing the write operation of the microcomputer of FIG. 1;

FIGS. 8A through 8J are timing diagrams for showing the 16-bit data read operation of the microcomputer of FIG. 7;

FIGS. 9A through 9J are timing diagrams for showing the 16-bit data write operation of the microcomputer of FIG. 7;

FIGS. 10A through 10J are timing diagrams for showing the 8-bit data read operation of the microcomputer of FIG. 7;

FIGS. 11A through 11J are timing diagrams for showing the 8-bit data write operation of the microcomputer of FIG. 7.

DESCRIPTION OF THE PREFERRED EMBODIMENTS

Before the description of the preferred embodiments, a prior art microcomputer will be explained with reference to FIGS. 1, 2A through 2I and FIGS. 3A through 3I.

Figure 1:
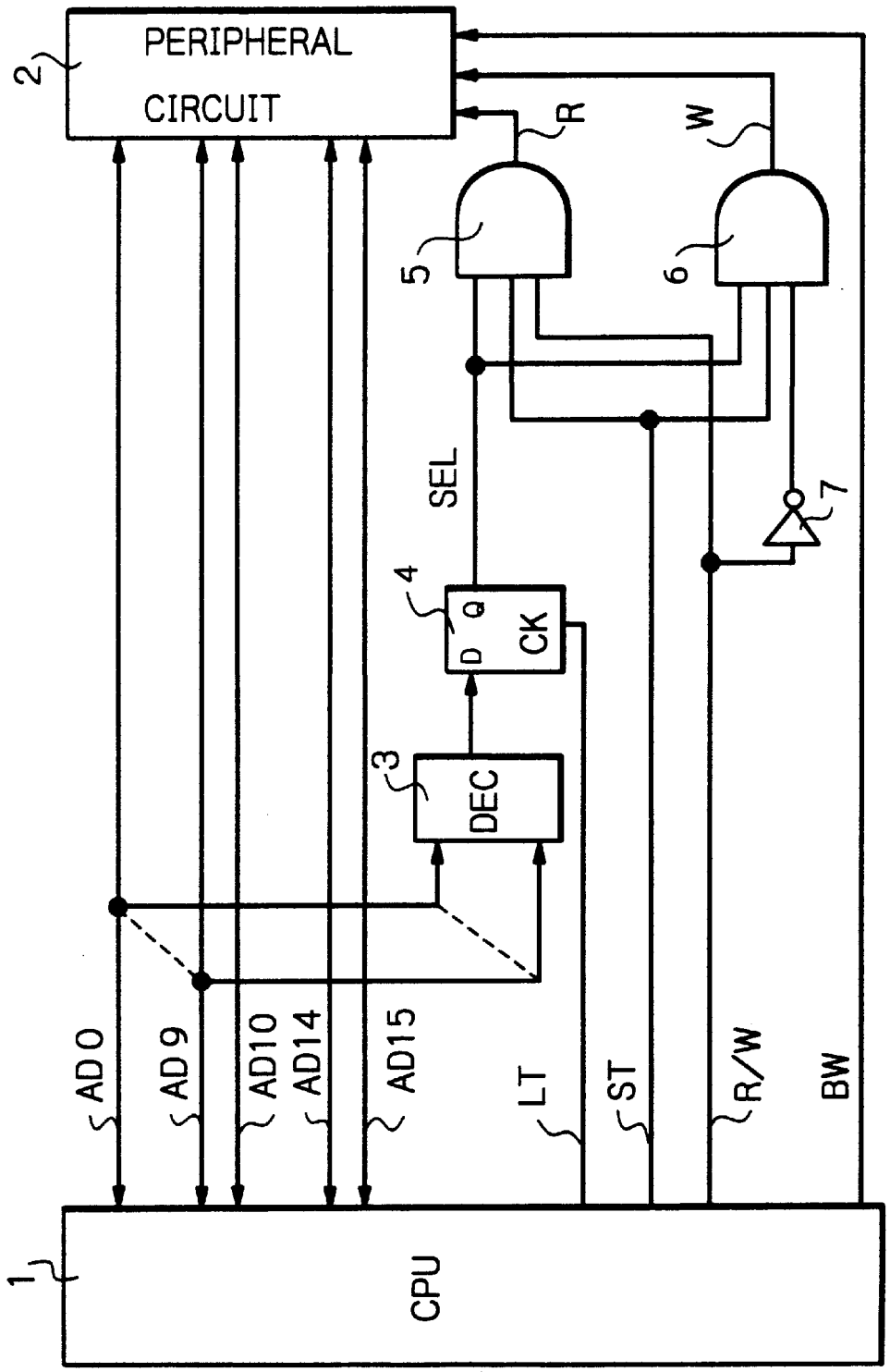
FIG. 1 is a block circuit diagram illustrating a prior art microcomputer.

In FIG. 1, which illustrates a prior art microcomputer, a CPU 1 and a peripheral circuit 2 are connected by multiplex buses AD0 through AD15. In a 16-bit read mode, 10 address bits are supplied from the CPU 1 via the buses AD0 to AD9 to the peripheral circuit 2, and thereafter, 16 data bits are supplied from the peripheral circuit 2 via the buses AD0 through AD15 to the CPU 1. On the other hand, in a 16-bit write mode, 10 address bits are supplied from the CPU 1 via the buses AD0 to AD9 to the peripheral circuit 2, and thereafter, 16 data bits are supplied from the CPU 1 via the buses AD0 through AD15 to the peripheral circuit 1. Note, that, in an 8-bit read or write mode, 8 data bits are supplied between the CPU 1 and the peripherial circuit 2 via the buses AD0 to AD9.

In a read/write mode, the CPU 1 generates a latch signal LT, a strobe signal ST, a read/write selection signal R/W and a bus width signal BW.

Also, a decoder 3 is provided to decode the address bits on the buses AD0 to AD9 to generate a selection signal for selecting the peripheral circuit 2. The selection signal is latched by the latch signal LT in a latch circuit 4 which generates a selection signal SEL. The selection signal SEL of the latch circuit 4 as well as the strobe signal ST are supplied to AND circuits 5 and 6. Also, the read/write selection signal R/W is supplied directly to the AND circuit 5, and the read/write selection signal R/W is supplied via an inverter 7 to the AND circuit 6. The AND circuit 5 generates a read signal R, while the AND circuit 6 generates a write signal W.

Further, the bus width signal BW is supplied directly to the peripheral circuit 2. In this case, if BW="0"(low), the peripheral circuit 2 enters a 16-bit access mode. On the other hand, if BW="1"(high), the peripheral circuit 2 enters an 8-bit access mode.

The read operation of the microcomputer of FIG. 1 is explained next with reference to FIGS. 2A through 2I. Here, a read bus cycle is constructed by four timing periods B1, B2, B3 and B4. Also, as shown in FIG. 2E, the read/write selection signal R/W is "1"(high), and as shown in FIG. 2I, the bus width signal BW is "0"(low) indicating a 16-bit access.

In the timing periods B1 and B2, the CPU 1 generates an address indicating the peripheral circuit 2. As shown in FIG. 2A, this address is transmitted to the buses AD0 to AD9. As a result, the output of the decoder 3 is made high. Also, in the timing period B1, as shown in FIG. 2C, the CPU 1 generates a latch signal LT. As a result, in the timing period B2, as shown in FIG. 2D, the output of the decoder 3 is latched in the latch circuit 4 to generate a selection signal SEL.

In the timing periods B1 and B2, note that the potentials at the buses AD10 to AD15 are indefinite.

Next, in the timing periods B3 and B4, as shown in FIG. 2F, the CPU 1 generates a strobe signal ST, and as a result, as shown in FIG. 2G, the AND circuit 5 generates a read signal R due to the high levels of the read/write selection signal R/W and the selection signal SEL. Thus, as shown in FIGS. 2A and 2B, the peripheral circuit 2 generates 16-bit data on the buses B0 through B15. Then, the data on the buses B0 through B15 are taken into the CPU 1.

The write operation of the microcomputer of FIG. 1 is explained next with reference to FIGS. 3A through 3I. Here, a write bus cycle is also constructed by four timing periods B1, B2, B3 and B4. Also, as shown in FIG. 3E, the read/write selection signal R/W is "0"(low), and as shown in FIG. 3I, the bus width signal a BW is "0"(low) indicating a 16-bit access.

In the Liming periods B1 and B2, the CPU 1 generates an address indicating the peripheral circuit 2. As shown in FIG. 3A, this address is transmitted to the buses AD0 to AD9. As a result, the output of the decoder 3 is made high. Also, in the timing period B1, as shown in FIG. 2C, the CPU 1 generates a latch signal LT. As a result, in the timing period B2, as shown in FIG. 3D, the output of the decoder 3 is latched in the latch circuit 4 to generate a selection signal SEL.

In the timing periods B1 and B2, note that the potentials at the buses AD10 to AD15 are indefinite.

Next, in the timing periods B3 and B4, as shown in FIGS. 3A and 3B, the CPU 1 generates 16-bit data on the buses AD0 through AD15.

Also, in the timing period B4, as shown in FIG. 3F, the CPU 1 generates a strobe signal ST, and as a result, as shown in FIG. 3H, the AND circuit 6 generates a write signal W due to the low level of the read/write selection signal R/W and the high level of the selection signal SEL. Thus, the data on the buses AD through AD15 are written into the peripheral circuit 2.

In the microcomputer incorporating the CPU 1 and the peripheral circuit 2 into one chip, however, control signal lines for the signals LT, ST, R/W and BW are required. Since the control signal lines are generally very long, the large number of control signal lines is disadvantageous in view of the integration. Note that, if the number of peripheral circuits incorporated into one chip is increased, the number of control signal lines is further increased, which further reduces the integration.

Figure 4:
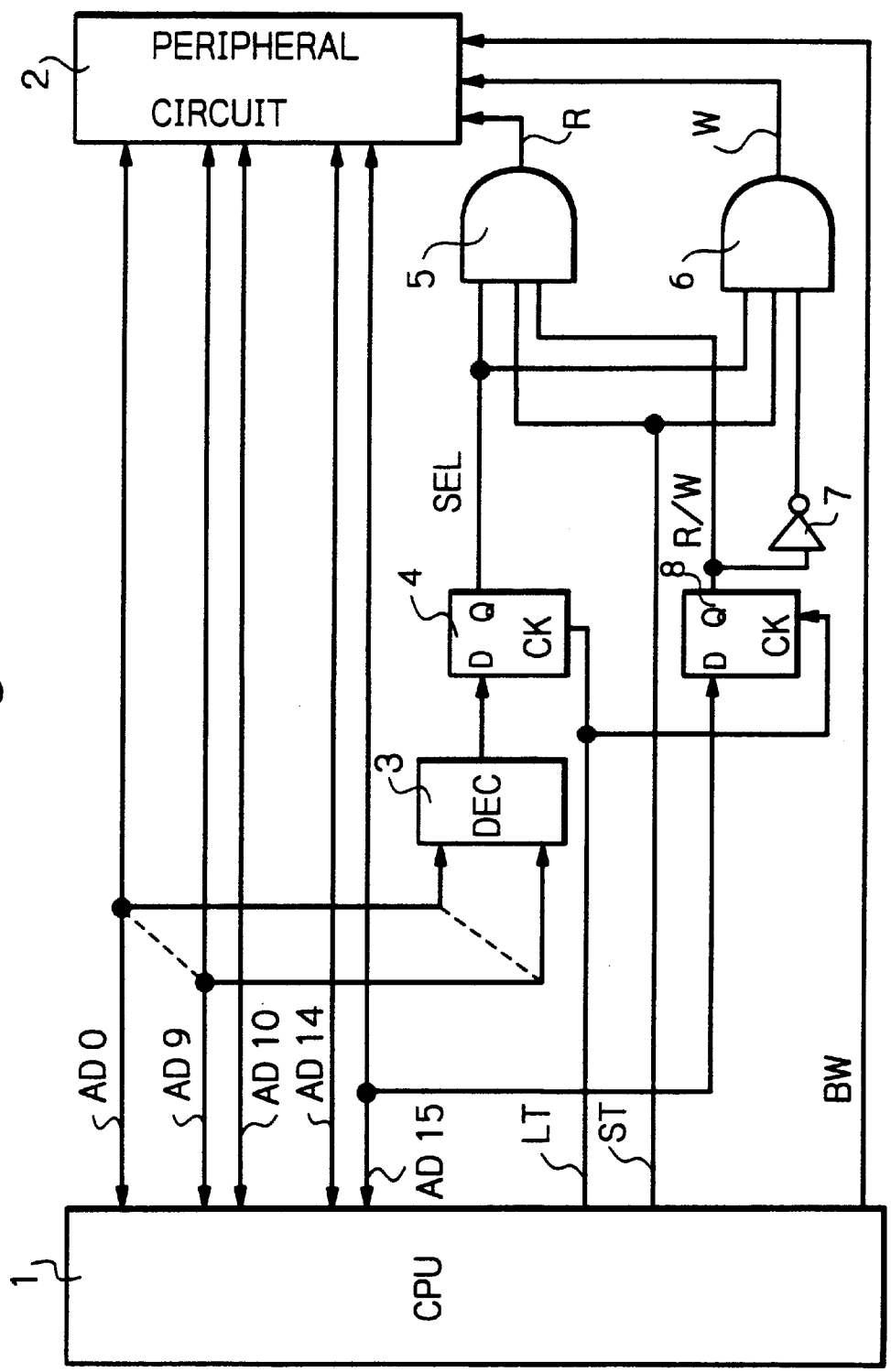
FIG. 4 is a block circuit diagram illustrating a first embodiment of the microcomputer according to the present invention.

In FIG. 4, which illustrates a first embodiment of the present invention, the control signal line for the read/write selection signal R/W of FIG. 1 is omitted, and instead of this, a latch circuit 8 is provided between the bus AD15 and the AND circuit 5 (the inverter 7). That is, in FIG. 4, when the bus AD15 is not used as a data bus, use is made of the bus AD15 as the control signal line for the read/write selection signal R/W of FIG. 1.

Figure 5:
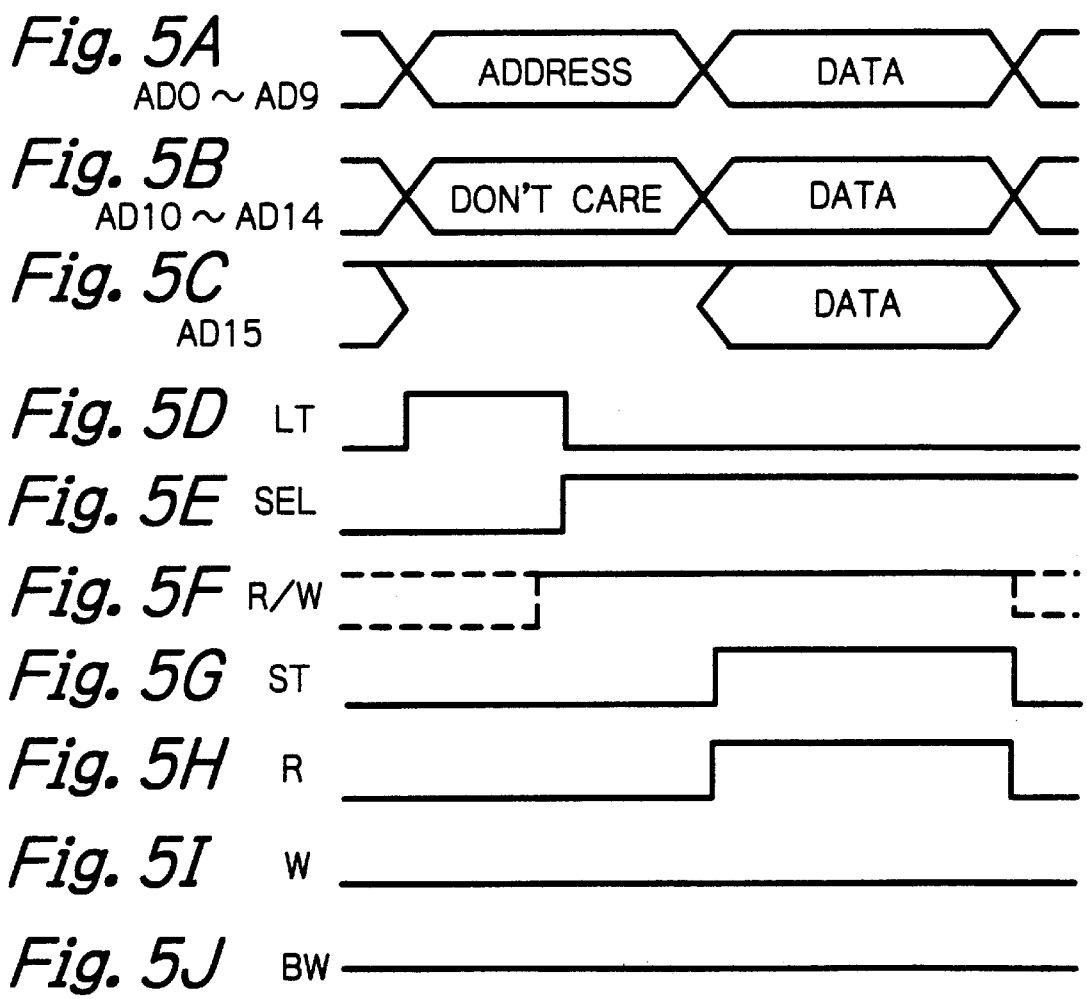
FIGS. 5A through 5J are timing diagrams for showing the read operation of the microcomputer of FIG. 4.

The read operation of the microcomputer of FIG. 4 is explained next with reference to FIGS. 5A through 5J. Here, a read bus cycle is constructed by four timing periods B1, B2, B3 and B4. Also, and as shown in FIG. 5J, the bus width signal BW is "0"(low) indicating a 16-bit access.

In the timing periods B1 and B2, the CPU 1 generates an address indicating the peripheral circuit 2. As shown in FIG. 5A, this address is transmitted to the buses AD0 to AD9. As a result, the output of the decoder 3 is made high. Simultaneously, the CPU 1 generates a high level signal on the bus B15. Also, in the timing period B1 as shown in FIG. 5D, the CPU 1 generates a latch signal LT. As a result, in the timing period B2, as shown in FIG. 5E, the output of the decoder 3 is latched in the latch circuit 4 to generate a selection signal SEL. Simultaneously, as shown in FIG. 5F, the high level signal at the bus AD15 is latched in the latch circuit 8 to generate a read/write selection signal R/W.

In the timing periods B1 and B2, note that the potentials at the buses AD10 to AD14 are indefinite.

Next, in the timing periods B3 and B4, as shown in FIG. 5G, the CPU 1 generates a strobe signal ST, and as a result, as shown in FIG. 5H, the AND circuit 5 generates a read signal R due to the high levels of the read/write selection signal R/W and the selection signal SEL. Thus, as shown in FIGS. 5A and 5B, the peripheral circuit 2 generates 16-bit data on the buses B0 through B15. Then, the data on the buses B0 through B15 are taken into the CPU 1.

Figure 6:
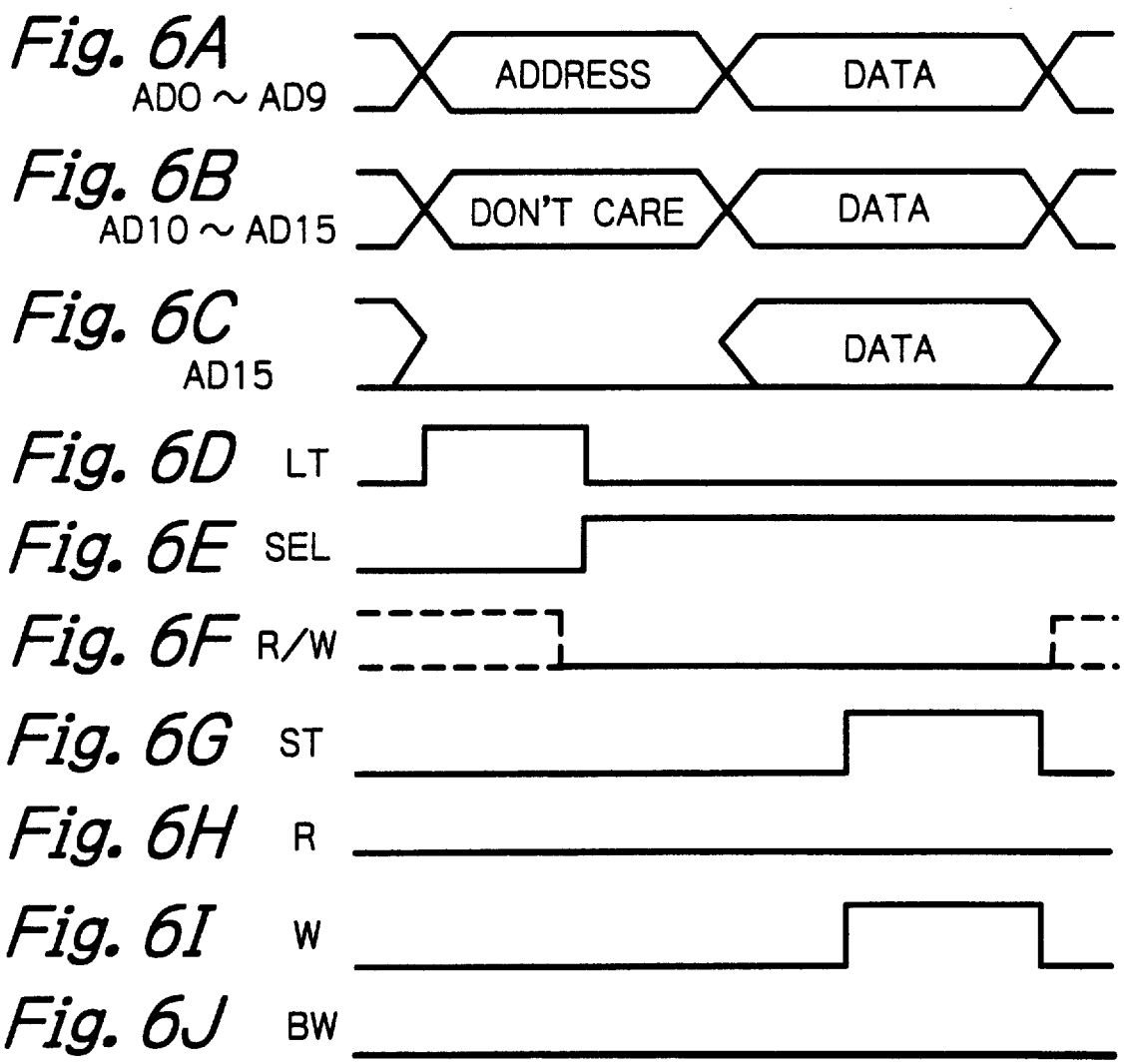
FIGS. 6A through 6J are timing diagrams for showing the write operation of the microcomputer of FIG. 4.

The write operation of the microcomputer of FIG. 4 is explained next with reference to FIGS. 5A through 6J. Here, a write bus cycle is constructed by four timing periods B1, B2, B3 and B4. Also, and as shown in FIG. 6J, the bus width signal BW is "0"(low) indicating a 16-bit access.

In the timing periods B1 and B2, the CPU 1 generates an address indicating the peripheral circuit 2. As shown in FIG. 6A, this address is transmitted to the buses AD0 to AD9. As a result, the output of the decoder 3 is made high. Simultaneously, the CPU 1 generates a low level signal on the bus AD15. Also, in the timing period B1, as shown in FIG. 6D, the CPU 1 generates a latch signal LT. As a result, in the timing period B2, as shown in FIG. 6E, the decoder 3 is latched in the latch circuit 4 to generate a selection signal SEL. Simultaneously, as shown in FIG. 6F, the low level signal at the bus AD15 is latched in the latch circuit 8 to generate a read/write selection signal R/W.

In the timing periods B1 and B2, note that the potentials at the buses AD10 to AD14 are indefinite.

Next, in the timing periods B3 and B4, as shown in FIGS. 6A and 6B, the CPU 1 generates 16-bit data on the buses AD0 through AD15.

Also, in the timing period B4, as shown in FIG. 6G, the CPU 1 generates a strobe signal ST, and as a result, as shown in FIG. 6I, the AND circuit 6 generates a write signal W due to the low level of the read/write selection signal R/W and the high level of the selection signal SEL. Thus, the data on the buses AD0 through AD15 are written into the peripheral circuit 2.

Thus, in the microcomputer of FIG. 4, since the control signal line for the read/write selection signal R/W of FIG. 1 is unnecessary, the integration of the microprocessor of FIG. 4 can be enhanced as compared with that of FIG. 1.

Figure 7:
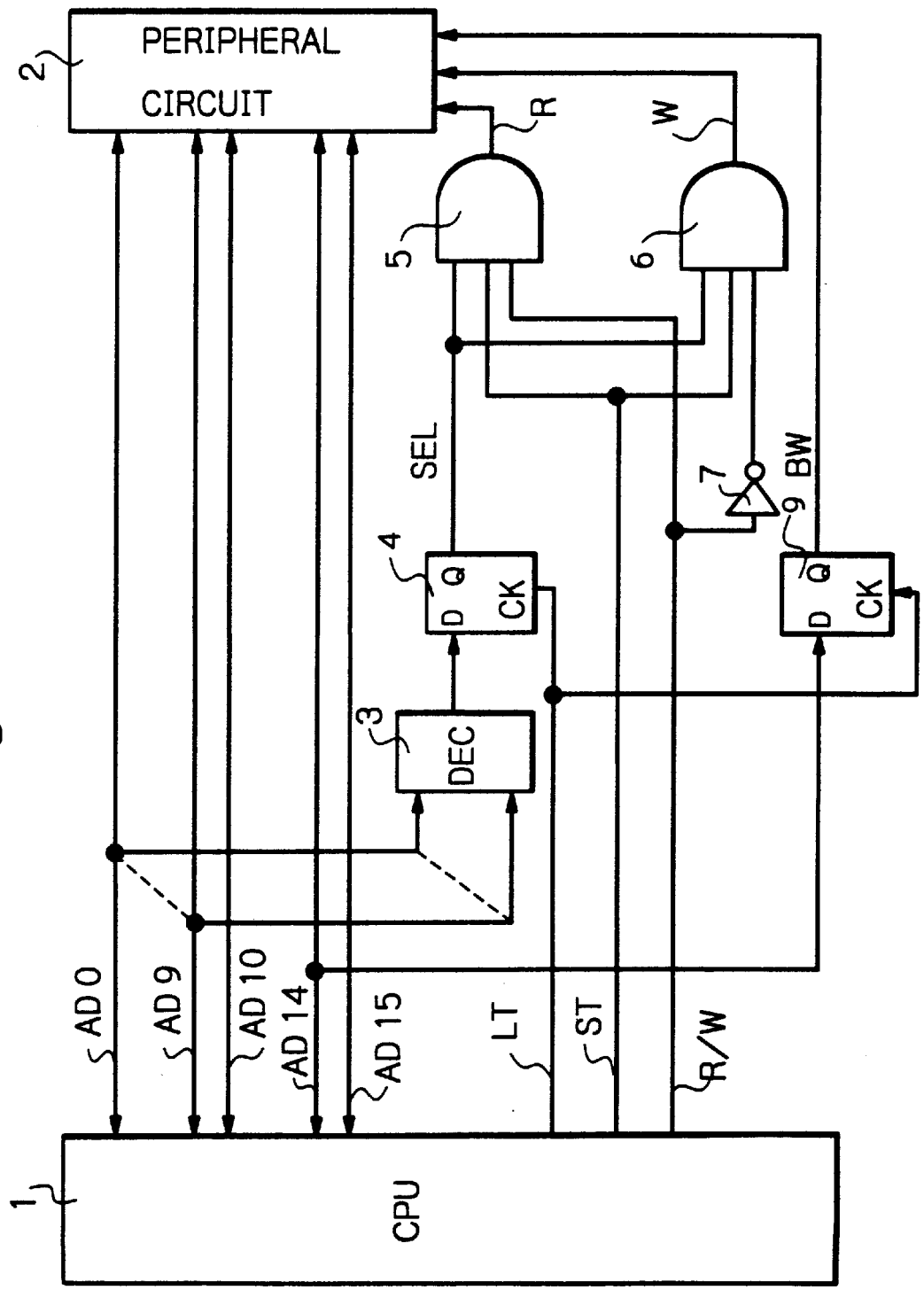
FIG. 7 is a block circuit diagram illustrating a second embodiment of the microcomputer according to the present invention.

In FIG. 7, which illustrates a second embodiment of the present invention, the control signal line for the bus/width signal BW of FIG. 1 is omitted, and instead of this, a latch circuit 9 is provided between the bus AD14 and the peripheral circuit 2. That is, in FIG. 4, when the bus AD14 is not used as a data bus, use is made of the bus AD14 as the control signal line for the bus/width signal BW of FIG. 1.

The 16-bit data read operation of the microcomputer of FIG. 4 is explained next with reference to FIGS. 8A through 8J. Here, a read bus cycle is constructed by four timing periods B1, B2, B3 and B4. Also, as shown in FIG. 8F, the read/write selection signal R/W is "1"(high).

In the timing periods B1 and B2, the CPU 1 generates an address indicating the peripheral circuit 2. As shown in FIG. 8A, this address is transmitted to the buses AD0 to AD9. As a result, the output of the decoder 3 is made high. Simultaneously, the CPU 1 generates a low level signal on the bus AD14. Also, in the timing period B1, as shown in FIG. 8D, the CPU 1 generates a latch signal LT. As a result, in the timing period B2, as shown in FIG. 8E, the output of the decoder 3 is latched in the latch circuit 4 to generate a selection signal SEL. Simultaneously, as shown in FIG. 8J, the low level signal at the bus AD14 is latched in the latch circuit 9 to generate a bus/width signal BW for a 16-bit data access.

In the Liming periods B1 and B2, note that the potentials at the buses AD10 to AD13 and AD15 are indefinite.

Next, in the timing periods B3 and B4, as shown in FIG. 8G, the CPU 1 generates a strobe signal ST, and as a result, as shown in FIG. 8H, the AND circuit 5 generates a read signal R due to the high levels of the read/write selection signal R/W and the selection signal SEL. Thus, as shown in FIGS. 8A and 8B, the peripheral circuit 2 generates 16-bit data on the buses AD0 through AD15. Then, the data on the buses B0 through AD15 are taken into the CPU 1.

The 16-bit data write operation of the microcomputer of FIG. 4 is explained next with reference to FIGS. 9A through 9I. Here, a write bus cycle is constructed by four timing periods B1, B2, B3 and B4. Also, as shown in FIG. 9F, the read/write selection signal R/W is "0"(low).

In the timing periods B1 and B2, the CPU 1 generates an address indicating the peripheral circuit 2. As shown in FIG. 9A, this address is transmitted to the buses AD0 to AD9. As a result, the output of the decoder 3 is made high. Simultaneously, the CPU 1 generates a low level signal on the bus B14. Also, in the timing period B1, as shown in FIG. 9D, the CPU 1 generates a latch signal LT. As a result, in the timing period B2, as shown in FIG. 9E, the output of the decoder 3 is latched in the latch circuit 4 to generate a selection signal SEL. Simultaneously, as shown in FIG. 9F, the low level signal at the bus AD14 is latched in the latch circuit 9 to generate a bus/width signal BW for a 16-bit data access.

In the timing periods B1 and B2, note that the potentials at the buses AD10 to AD13 and AD15 are indefinite.

Next, in the timing periods B3 and B4, as shown in FIGS. 9A and 9B, the CPU 1 generates 16-bit data on the buses AD0 through AD15.

Also, in the timing period B4, as shown in FIG. 9G, the CPU 1 generates a strobe signal ST, and as a result, as shown in FIG. 9I, the AND circuit 6 generates a write signal W due Lo the low level of the read/write selection signal R/W and the high level of the selection signal SEL. Thus, the data on the buses AD0 through AD15 are written into the peripheral circuit 2.

The 8-bit data read operation of the microcomputer of FIG. 4 is explained next with reference to FIGS. 10A through 10I. Here, a read bus cycle is constructed by four timing periods B1, B2, B3 and B4. Also, as shown in FIG. 10F, the read/write selection signal R/W is "1"(high).

In the timing periods B1 and B2, the CPU 1 generates an address indicating the peripheral circuit 2. As shown in FIG. 10A, this address is transmitted to the buses AD0 to AD9. As a result, the output of the decoder 3 is made high. Simultaneously, the CPU 1 generates a high level signal on the bus AD14. Also, in the timing period B1, as shown in FIG. 10D, the CPU 1 generates a latch signal LT. As a result, in the timing period B2, as shown in FIG. 10E, the output of the decoder 3 is latched in the latch circuit 4 to generate a selection signal SEL. Simultaneously, as shown in FIG. 10J, the high level signal at the bus AD14 is latched in the latch circuit 9 to generate a bus/width signal BW for an 8-bit data access.

In the timing periods B1 and B2, note that the potentials at the buses AD10 to AD13 and AD15 are indefinite.

Next, in the timing periods B3 and B4, as shown in FIG. 10G, the CPU 1 generates a strobe signal ST, and as a result, as shown in FIG. 10H, the AND circuit 5 generates a read signal R due to the high levels of the read/write selection signal R/W and the selection signal SEL. Thus, as shown in FIG. 10A, the peripheral circuit 2 generates 8-bit data on the buses AD0 through AD7. Then, the data on the buses AD0 through AD7 are taken into the CPU 1. Note that, even in the timing operiods B3 and B4, the potentials at the buses AD8 through AD15 are indefinite.

The 8-bit data write operation of the microcomputer of FIG. 4 is explained next with reference to FIGS. 11A through 11I. Here, a write bus cycle is constructed by four timing periods B1, B2, B3 and B4. Also, as shown in FIG. 11F, the read/write selection signal R/W is "0"(low).

In the timing periods B1 and B2, the CPU 1 generates an address indicating the peripheral circuit 2. As shown in FIG. 11A, this address is transmitted to the buses AD0 to AD9. As a result, the output of the decoder 3 is made high. Simultaneously, the CPU 1 generates a high level signal on the bus B14. Also, in the timing period B1, as shown in FIG. 11D, the CPU 1 generates a latch signal LT. As a result, in the timing period B2, as shown in FIG. 11E, the output of the decoder 3 is latched in the latch circuit 4 to generate a selection signal SEL. Simultaneously, as shown in FIG. 11F, the low level signal at the bus AD14 is latched in the latch circuit 9 to generate a bus/width signal BW for an 8-bit data access.

In the timing periods B1 and B2, note that the potentials at the buses AD10 to AD13 and AD15 are indefinite.

Next, in the timing periods B3 and B4, as shown in FIG. 11A, the CPU 1 generates 8-bit data on the buses AD0 through AD7.

Also, in the timing period B4, as shown in FIG. 11G, the CPU 1 generates a strobe signal ST, and as a result, as shown in FIG. 11I, the AND circuit 6 generates a write signal W due Lo the low level of the read/write selection signal R/W and the high level of the selection signal SEL. Thus, the data on the buses AD0 through AD7 are written into the peripheral circuit 2.

Thus, in the microcomputer of FIG. 7, since the control signal line for the bus/width signal BW of FIG. 1 is unnecessary, the integration of the microprocessor of FIG. 7 can be enhanced as compared with that of FIG. 1.

Figure 12:
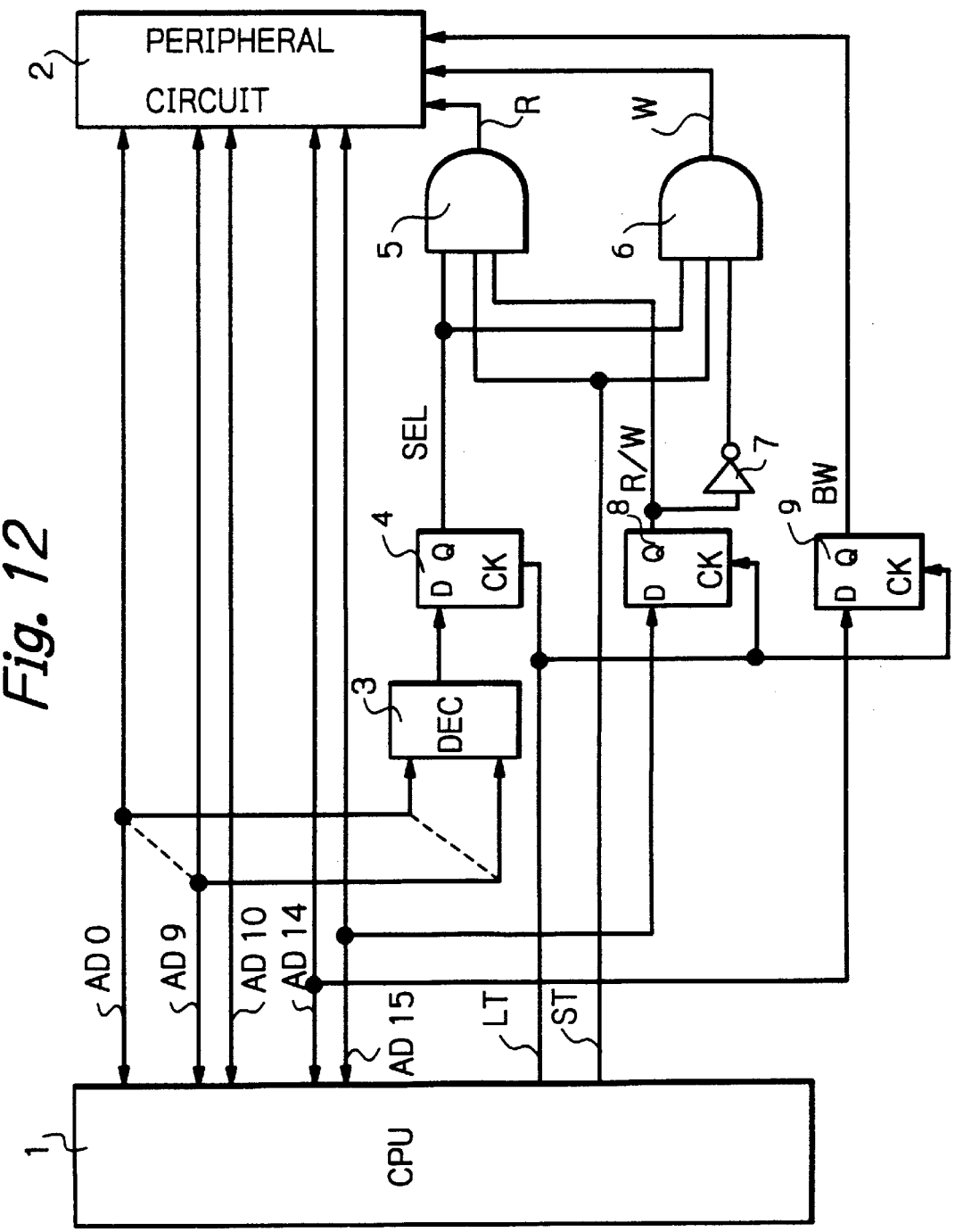
FIG. 12 is a block circuit diagram illustrating a third embodiment of the microcomputer according to the present invention.

In FIG. 12, which illustrates a third embodiment of the present invention, the first embodiment as illustrated in FIG. 4 is combined with the second embodiment as illustrated in FIG. 7.

Thus, in the microcomputer of FIG. 12, since the control signal lines for the read/write selection signal R/W and the bus/width signal BW of FIG. 1 are unnecessary, the integration of the microprocessor of FIG. 12 can be further enhanced as compared with that of FIG. 1.

As explained hereinabove, according to the present invention, since the number of control signal lines between a CPU and at least one peripheral circuit is reduced, the integration can be enhanced.

I claim:

1. A microcomputer comprising:
   a central processing unit (CPU);
   at least one peripheral circuit;
   a plurality of multiplex buses connected between said CPU and said peripheral circuit; and
   a latch circuit, said latch circuit having a first control signal line connected to a specific one of said multiplex buses, said first control signal line transmitting a first control signal, said latch circuit generating a second control signal to control said peripheral circuit.

2. The microcomputer as set forth in claim 1, wherein said CPU generates said first control signal on said specific one of said multiplex buses at approximately the same time said CPU generates address signals on one or more other of said multiplex buses.

3. The microcomputer as set forth in claim 2, further comprising a latch control signal line connected between said CPU and said latch circuit, said latch control signal line being separate from said multiplex buses, wherein said CPU generates a latch signal and transmits said latch signal on said latch control signal line to said latch circuit at approximately the same time said CPU generates address signals on said one or more other multiplex buses.

4. The microcomputer as set forth in claim 1, wherein said second control signal is a read/write selection signal.

5. The microcomputer as set forth in claim 1, wherein said second control signal is a bus width signal.

6. A microcomputer comprising:
a central processing unit (CPU);
a peripheral circuit,
buses connected between said CPU and said peripheral circuit, said buses being multiplexed for an address bus and a data bus having a larger number of bits than those of said address bus;
a decoder, connected to said address bus, for decoding data on said address bus to generate a selection signal for said peripheral circuit;
a first control signal line, connected to said CPU, for transmitting a latch signal;
a second control signal line, connected to said CPU, for transmitting a strobe signal;
a first latch circuit, connected to said decoder and said first control signal line, for latching said selection signal in response to said latch signal;
a second latch circuit, connected to one of said buses and said first control signal line, for latching data on said one of said buses in response to said latch signal, said one of said buses serving as said data bus and not as said address bus, said CPU generating a read/write selection signal on said one of said buses when said buses are multiplexed to said address bus;
a first AND circuit, connected to said first and second latch circuits and said second control signal line, for generating a read signal and transmitting said read signal to said peripheral circuit;
an inverter connected to said second latch circuit; and
a second AND circuit, connected to said first latch ciruits, said inverter and said second control signal line, for generating a write signal, and transmitting said write signal to said peripheral circuit.

7. A microcomputer comprising:
a central processing unit (CPU);
a peripheral circuit,
buses connected between said CPU and said peripheral circuit, said buses being multiplexed for an address bus and a data bus having a larger number of bits than those of said address bus;
a decoder, connected to said address bus, for decoding data on said address bus to generate a selection signal for said peripheral circuit;
a first control signal line, connected to said CPU, for transmitting a latch signal;
a second control signal line, connected to said CPU, for transmitting a strobe signal;
a third control signal line, connected to said CPU, for transmitting a read/write selection signal;
a first latch circuit, connected to said decoder and said first control signal line, for latching said selection signal in response to said latch signal;
a second latch circuit, connected to one of said buses and said first control signal line, for latching data on said one of said buses in response to said latch signal, said one of said buses serving as said data bus and not as said address bus, said CPU generating a bus/width signal on said one of said buses when said buses are multiplexed to said address bus;
a first AND circuit, connected to said first latch circuit and said second and third control signal lines, for generating a read signal and transmitting said read signal to said peripheral circuit;
an inverter connected to said second latch circuit; and
a second AND circuit, connected to said first latch ciruits, said inverter and said second control signal line, for generating a write signal, and transmitting said write signal to said peripheral circuit;
an output of said second latch circuit being transmitted to said peripheral circuit.

8. A microcomputer comprising:
a central processing unit (CPU);
a peripheral circuit,
buses connected between said CPU and said peripheral circuit, said buses being multiplexed for an address bus and a data bus having a larger number of bits than those of said address bus;
a decoder, connected to said address bus, for decoding data on said address bus to generate a selection signal for said peripheral circuit;
a first control signal line, connected to said CPU, for transmitting a latch signal;
a second control signal line, connected to said CPU, for transmitting a strobe signal;
a first latch circuit, connected to said decoder and said first control signal line, for latching said selection signal in response to said latch signal;
a second latch circuit, connected to a first one of said buses arid said first control signal line, for latching data on said first one of said buses in response to said latch signal, said first one of said buses serving as said data bus and not as said address bus, said CPU generating a read/write selection signal on said first one of said buses when said buses are multiplexed to said address bus;
a third latch circuit, connected to a second one of said buses and said first control signal line, for latching data on said second one of said buses in response to said latch signal, said second one of said buses serving as said data bus and not as said address bus, said CPU generating a bus/width signal on said one of said buses when said buses are multiplexed to said address bus;
a first AND circuit, connected to said first and second latch circuit and said second control signal line, for generating a read signal and transmitting said read signal to said peripheral circuit;
an inverter connected to said second latch circuit; and
a second AND circuit, connected to said first latch circuit, said inverter and said second control signal line, for generating a write signal, and transmitting said write signal to said peripheral circuit;
an output of said third latch circuit being transmitted to said peripheral circuit.

* * * * *